United States Patent [19]

Nazareno et al.

[11] Patent Number: 5,120,494
[45] Date of Patent: Jun. 9, 1992

[54] REACTOR-CORE ISOLATION COOLING SYSTEM WITH DEDICATED GENERATOR

[75] Inventors: Edgardo V. Nazareno, San Jose; Charles W. Dillmann, Morgan Hill, both of Calif.

[73] Assignee: General Electric Company, San Jose, Calif.

[21] Appl. No.: 709,456

[22] Filed: Jun. 3, 1991

Related U.S. Application Data

[63] Continuation-in-part of Ser. No. 553,073, Jul. 10, 1990.

[51] Int. Cl.⁵ .................................................. G21C 15/18
[52] U.S. Cl. ...................................... 376/282; 376/298
[58] Field of Search ............... 376/298, 299, 297, 282, 376/277

[56] References Cited

U.S. PATENT DOCUMENTS

| | | | |
|---|---|---|---|
| 4,187,146 | 2/1980 | Shen et al. | 376/298 |
| 4,654,190 | 3/1987 | Schlonski | 376/282 |
| 4,818,475 | 4/1989 | Gluntz et al. | 376/282 |

Primary Examiner—Brooks H. Hunt
Assistant Examiner—Frederick H. Voss
Attorney, Agent, or Firm—Robert R. Schroeder

[57] ABSTRACT

A boiling water nuclear water plant includes a reactor core isolation cooling (RCIC) system in which a turbine used to pump feedwater to the reactor also drives a generator. The generator is used to drive RCIC components, such as a room cooler and control electronics, during station blackout.

6 Claims, 1 Drawing Sheet

REACTOR-CORE ISOLATION COOLING SYSTEM WITH DEDICATED GENERATOR

This is a continuation-in-part of pending U.S. patent application Ser. No. 07/553,073, filed Jul. 10, 1990.

BACKGROUND OF THE INVENTION

This invention relates to nuclear reactors and, more particularly, to a reactor-core isolation cooling (RCIC) system. A major objective of the present invention is to provide for an RCIC system with enhanced effectiveness in the event of a loss of electrical power to the incorporating reactor plant.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

Dual-phase reactors store heat generated by the core primarily in the form of vapor pressure generated by the vaporizing of a liquid heat transfer medium. The vapor pressure can used to rotate a turbine that drives a power output generator to produce electricity. Condensate from the turbine can be returned to the reactor, merging with recirculating liquid for further heat transfer and cooling. The primary example of a dual-phase reactor is a boiling-water reactor (BWR). Dual-phase reactors are contrasted with single-phase reactors, which store energy primarily in the form of elevated temperatures of a liquid heat-transfer medium, such as liquid metal. The following discussion relating to BWRs is readily generalizable to other forms of dual-phase reactors.

Modern nuclear reactor plants are designed to handle a wide range of failure scenarios, such as those that might be induced by an earthquake. For example, reactors must be designed to handle an abrupt isolation of the turbine from the reactor by shutting down the reactor safely, while protecting the reactor core from damage due to overheating. Control rods can be inserted into the core to decrease its reactivity. Nonetheless, the core continues to generate a considerable amount of "decay" heat. In the absence of protective systems, the decay heat could create a pressure buildup within the reactor vessel. The pressure could cause a breach in the reactor vessel or in associated conduits. The breach could cause a loss of coolant. The loss of coolant could prevent transfer of heat from the core, which could then melt. This would, in essence, render the plant unrecoverable.

RCIC systems constitute one class of protective systems utilized in BWR reactors to protect the core in the event the main turbine is isolated from the reactor. An RCIC system regulates water level within a reactor pressure vessel by pumping water from an external reservoir into the vessel when the level falls below a predetermined threshold. The RCIC pump is driven by a RCIC turbine. Steam output from the reactor pressure vessel is diverted from the main steam line (which feeds the main turbine) to drive the RCIC turbine.

While the RCIC turbine itself is powered by steam, a typical RCIC system is dependent on electrical power. For example, RCIC operation requires that steam and water flows be rerouted, typically by opening and closing certain electrically operated valves. In addition, electricity is required by the control loop that regulates the rate at which water is pumped by the RCIC system into the reactor pressure vessel. In particular, this loop typically includes a flow element used to measure the RCIC pump output, control electronics required to compare a measured flow with a target flow, and an electrically-controlled hydraulically-powered turbine governor valve. Additional RCIC control electronics also require electricity for their operation.

Furthermore, some RCIC components, for example, the control electronics and motorized valves, are vulnerable to excessive heat. Heat accumulates due to conduction, radiation and convection from the steam driving the RCIC turbine and from dissipation from electrical circuits. To protect heat-sensitive RCIC components, cooling can be provided by a plant heating, ventilation and air conditioning (HVAC) system, which is typically AC powered.

Since a large number of RCIC system and other safety systems rely to some extent on electrical power, a safe reactor plant must address the scenario of a loss of AC power along with a shutdown of the main turbine. An earthquake could knock down power lines to a reactor plant and cause or force isolation of the main turbine, causing a station blackout. Thus, an RCIC operation must be available to handle decay heat despite a lack of electrical power from the main turbine and from an external electrical power grid and onsite diesel generators.

A nuclear reactor plant typically includes a large back-up battery in case the plant is decoupled from AC power. During normal operation, the battery is charged by the AC power. During a blackout, the battery replaces the AC power. However, the energy stored by such a battery is necessarily limited. Furthermore, the RCIC system must compete with many other plant systems for battery power. Typically, batteries can provide a few hours of electrical power. However, a reasonable target value would be for about eight hours of backup power. Greater sizes and numbers of batteries can be used to supply this additional power. However, there are problems with the cost, volume and complexity of a system with the necessary battery power. In addition, there is a problem in allocating battery power, since less important devices might drain the battery at the expense of the RCIC system, which is essential to protecting the reactor core during a blackout.

What is needed is an RCIC system which can provide for extended handling of decay heat and which has access to power relatively independent of demands of other plant subsystems. Preferably, this RCIC system would not require additional large batteries, or alternatives which are comparably expensive and voluminous.

SUMMARY OF THE INVENTION

In accordance with the present invention, an RCIC system includes an auxiliary generator. This dedicated RCIC generator provides electricity that is used by the RCIC components. In particular, the RCIC system room cooling and control subsystems can be powered by this generator. The main battery can be at least partially relieved of the RCIC load. In addition, the RCIC generator can be used to charge the main battery or a battery dedicated to the RCIC system to provide power when the RCIC turbine is temporary shutdown.

The RCIC generator provides electrical power whenever the RCIC pump is operating, and thus conveniently can supply the electrical power required to regulate the rate at which water is output by the RCIC system. Likewise, the RCIC generator provides electricity as heat accumulates due to dissipation of electrical energy and steam flow through the RCIC turbine. Conveniently, the room cooling for the RCIC system can be at least partially provided by the output of the RCIC generator.

Thus, an RCIC system can be at least partially self powering during a station blackout. Since the RCIC system is essential to protecting the core, this RCIC generator can extend the time the protection is afforded to the core. Of course, battery power can be used to implement RCIC functions that must be performed when the generator is not operating. These functions include valve control required to initiate RCIC operation, and control functions required to restart the RCIC turbine after a temporary shutdown. The electricity required while the RCIC pump is off can be provided by the main battery, or a dedicated RCIC battery can provide this function. In either case, the generator extends battery performance by charging the main and/or RCIC battery when the RCIC turbine is operating.

The advantages provided by the generator can include the provision of power for space cooling during a station blackout. These features can permit an RCIC system to avoid overheating of control electronics and actuators, so that the RCIC system can operate effectively for a longer duration. As a result, a reactor core can be protected during relatively long station blackouts. These and other features and advantages of the present invention are apparent in the following description with references to the drawings below.

DESCRIPTION OF THE PREFERRED EMBODIMENTS

Figure 1:
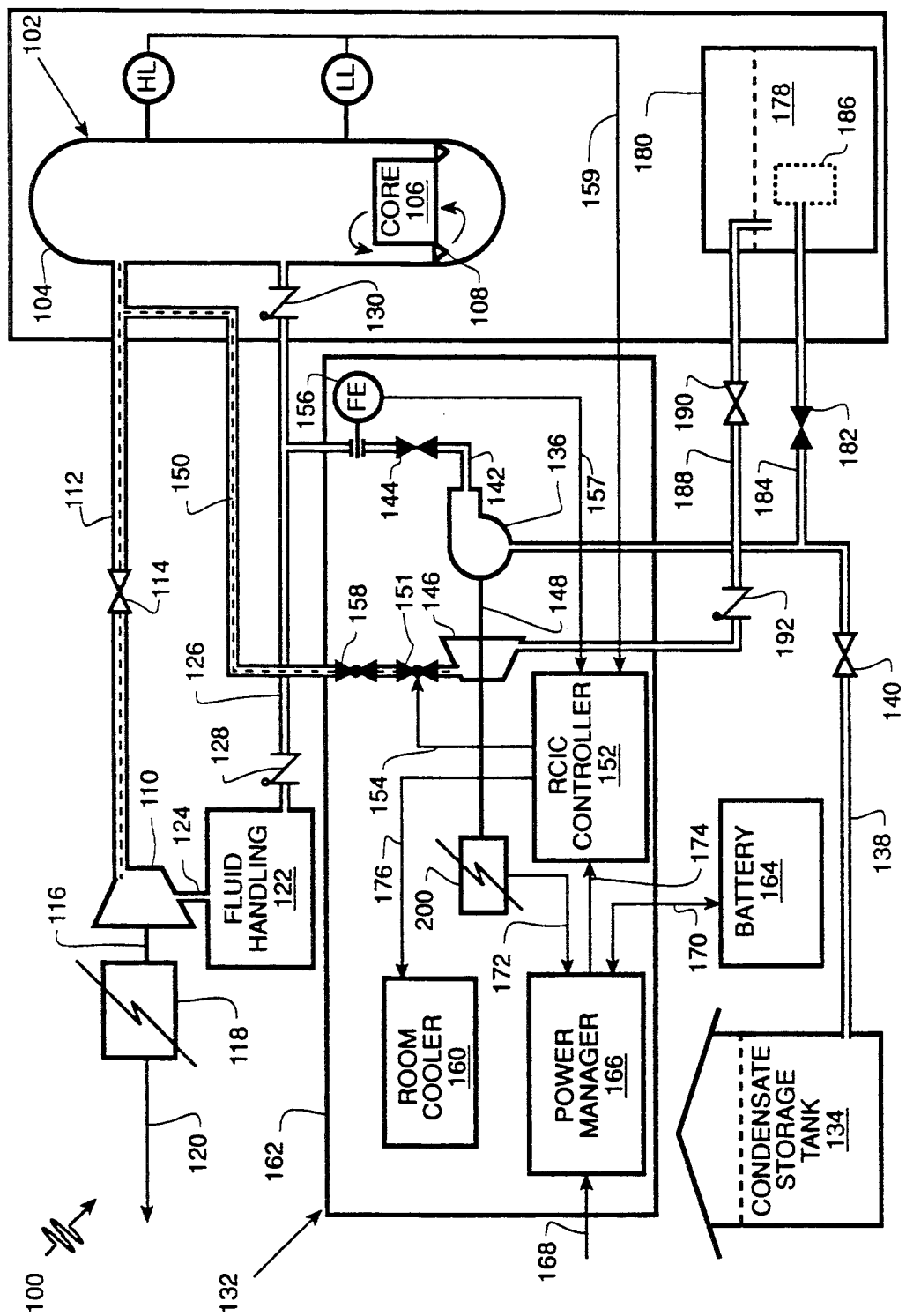
FIG. 1 is a schematic of a boiling-water reactor plant in accordance with the present invention.

In accordance with the present invention, a nuclear reactor plant 100 includes a boiling-water reactor 102 having a reactor pressure vessel 104 enclosing a core 106. Recirculation within vessel 104 and through core 106 is provided by pumps 108. Some of the water flowing up through core 106 is converted to steam. The steam is separated from the water and, during normal operation, is conveyed to a main turbine 110 via a main steam line 112, as provided by a normally open valve 114. The steam drives turbine 110 so that its shaft 116 drives an output generator 118 to provide electricity to a power grid via an output line 120. Steam transfers its pressure energy to turbine 110 and condenses. The condensate drains to a fluid handling system 122 via a water line 124. Fluid handling system 122 pumps condensate back to vessel 104 via a water line 126 and normally open check valves 128 and 130. Check valve 128 prevents backflow of water to fluid handling unit 122 when the RCIC system is pumping water.

In the event of a station blackout, reactor 102 is shut down. Shutdown involves inserting control rods into core 106 to limit its reactivity and closing valves 114 and 128 to isolate turbine 110 from reactor 102. Despite the decrease in core reactivity, significant decay heat can persist for days. A reactor core isolation cooling (RCIC) system 132 is designed to protect the core until the temperature inside vessel 104 drops from about 500° F. to a relatively safe 300° F., at which temperature other core cooling means are employed.

Core protection involves maintaining a safe water level in vessel 104. If the water level drops too far, heat will not be transferred from the core and the core will be damaged. If the water level is too high, it can be carried out the steam lines, disturbing turbine action.

In response to a low water level indication from low level indicator LL, RCIC system pumps water from a water storage tank 134 into vessel 104. More specifically, water level indicator LL sends a low level indication along instrumentation bus 135 to RCIC system 132. RCIC system 132 causes an RCIC pump 136 to draw water from water tank 134 along a water line 138 through a normally open valve 140. Water is forced out of pump 136 along a water line 142 through a valve 144 which is opened in response to a low reactor level. Water line 142 merges with water line 126. During a low reactor water level, check valve 130 remains open, while, as indicated above, check valve 128 is closed. Thus, the water output from RCIC pump 136 is forced into vessel 104. A typical pumping rate is about 800 gallons per minute. The water in tank 134 is reactor condensate provided by fluid handling system 122 during a sufficient portion of normal operation ensure an adequate supply of condensate for eight hours of feedwater to reactor 102. Condensate is used to ensure a suitable level of feedwater purity.

RCIC pump 136 is driven by an RCIC turbine 146 via a shaft 148. RCIC turbine is considerably smaller than power output turbine 110. The smaller size permits it to be driven by the smaller steam flow along a steam line 150 provided by the reactor during shutdown and is more than adequate to drive RCIC pump 136. Since it is more than adequate, RCIC turbine 146 includes a turbine governor valve 151 that limits its rotation rate.

Turbine governor valve 151 is controlled by an RCIC controller 152 via a control bus 154 so as to regulate the water flow rate into vessel 104. More specifically, the flow rate through water line 142 is measured by a flow element 156. The flow rate measurements are conveyed to RCIC controller 152 via signal line 157. RCIC controller 152 compares the measured flow rate against a target flow rate. If the measured flow rate is excessive, RCIC controller 152 partially closes turbine governor valve 151 to decrease the steam flow into turbine 146, reducing its rotation rate and that of RCIC pump 136. A complementary action is taken when the measured flow rate falls below the target rate.

It is RCIC controller 152 that receives the low water level indication from water level indicator LL along instrumentation bus 159 and opens a globe valve 158 and turbine governor valve 151 to initiate RCIC turbine 146. Once a high level indicator HL indicates that an upper water level threshold has been met, a corresponding indication is transmitted along bus 159 to RCIC controller 152, which then commands steam supply valve 158 and turbine governor valve 151 to close. This shuts off turbine 146 and pump 136 until the water level again falls below that monitored by low level water indicator LL.

Several RCIC components are temperature sensitive. All components are designed to operate at ambient temperatures of about 100° F. However, performance impairment and/or damage can occur at temperatures above 140° F. to 150° F. Specifically, electronic components of RCIC controller 152, the controller for hydraulically driven turbine governor valve 151, the motors that operate valves 140, 144, 158, 182, and 190 are all vulnerable to excessive temperatures. Accordingly, RCIC system 132 uses a room cooler 160 to cool the interior of an RCIC enclosure 162, which contains the vulnerable RCIC components. Room cooler 160 is an electrically powered freonbased vacuum refrigeration unit. If room color 160 fails to keep the temperature below about 140° C, as would occur if steam leaked into enclosure 162, RCIC system 132 shuts down.

If AC power remains available when main turbine 110 is isolated from reactor 102, the plant heating, ventilation, and air conditioning system will still be available. However, in the event of a station blackout, an alternative power source is required. Plant 100 includes a backup battery 164, but its capacity is limited to meeting plant requirements for only a few hours.

In accordance with the present invention, RCIC system 132 includes a generator 200, which serves as the primary power source of power for RCIC components. Generator 200 is driven by shaft 148 of RCIC turbine 146. Thus, electricity is provided whenever water is being pumped by pump 136. This electricity is used to run room cooler 160, RCIC controller 152, the governor of RCIC turbine 146, and the motor of globe valve 158. Battery power is used to start RCIC turbine 146 at the onset of isolation and during isolation, after pump 136 is turned off to limit the water flow into vessel 104. Battery power is also used to operate room cooling equipment, RCIC controller 152, RCIC motorized valves, turbine accessories, instrumentation, and control.

Power is managed by a power manager 166. Power manager 166 is arranged to receive AC power along a bus 168, battery power from battery 164 along a bus 170, and power from RCIC generator 200 along a line 172. Power manager 166 provides power from these three sources to RCIC controller 152. Power manager 166 distributes available AC power to charge battery 164, and to RCIC controller 152, as needed. In the absence of AC power, power manager 166 transfers power from RCIC generator 200 to RCIC controller 152 via a bus 174. In the absence of both AC power and RCIC generator power, power manager 166 conveys battery power to RCIC controller 152, as needed. Power manager 166 can also apply excess RCIC generator power to charge battery 164. Power manager includes suitable inverters and integraters for converting AC power to DC and vice versa.

RCIC controller 152, in conjunction with reactor instrumentation and dedicated RCIC instrumentation, monitors reactor water level, reactor pressure, the temperature in RCIC enclosure 162, the water flow rate through pump 136, and the steam flow rate through valve 158. Based upon the results of his monitoring, RCIC controller 152 adjusts turbine governor valve 151 to protect the core. RCIC controller 152 also operates room cooler 160, via a bus 176, as required to maintain a safe temperature level for the RCIC components. RCIC controller 152 distributes power and control signals to RCIC power-operated valves such as 158, 144, 182, 140 and 190, as required to effect these functions. (For illustrative simplicity, the control and power lines to these valves are not illustrated.)

To provide an additional layer of safety, reactor plant 100 provides for coupling a suppression pool 178 in a wet well 180 to RCIC 132. If the flow of storage tank 134 fails for some reason, valve 140 is closed and normally closed valve 182 is opened to provide an alternate coolant source for reactor 102. The water line 184 controlled by valve 182 is coupled to water line 138, downstream of valve 140, to provide communication with RCIC pump 136. Suppression pool 178 is designed to provide pressure relief during loss of coolant accidents. Its contents are more likely to include particulate matter which must be strained by a strainer 186 to protect pump 136.

Suppression pool 178 also condenses the exhaust steam from RCIC turbine 146. The exhaust steam discharges through an exhaust line 188, which is controlled by a normally opened valve 190 and a check valve 12. Check valve 192 prevents backflow toward turbine 146 when the RCIC turbine 146 is shut down and subsequent cooling of the exhaust line causes a negative pressure to develop in line 188.

Despite the use of an RCIC generator, the preferred embodiments of the present invention rely on battery power for some RCIC fuctions, specifically turbine start up. This function can be provided by a main battery. However, provision must be made for restarting the turbine late in the blackout. With relief by the generator and proper management of energy stored in the battery, the main battery storage can be adequate. Alternatively, a battery dedicated to the RCIC system can be used for turbine start up. Excess turbine energy can be used to charge this dedicated battery and/or the main battery.

The cooling system can operate in a variety of ways. A room cooler can be a manifold through which relatively cool water, or other coolant, flows in the vicinity of RCIC components. Air within an RCIC enclosure can be circulated to facilitate transfer of heat from the air to the coolant. The water can be the condensate in the storage tank on route to the RCIC pump, or water from another source. In either case, the water can be gravity fed, dispensing with an energy requirement for urging water through the manifold. The water can be precooled while AC power is available, to enhance its effectiveness during a blackout. Extending this concept further, encapsulated ice, frozen using AC power, can be stored within the RCIC enclosure to provide a heat sink during a blackout.

Air circulation within the RCIC enclosure can be provided by an electrically driven fan. Alternatively, a propeller attached to the turbine shaft can provide the necessary air circulation. In this case, generator electricity is not needed for cooling and can be dedicated to other RCIC functions such as turbine and steam flow control.

Alternative embodiments minimize requirements for restarting the turbine and maximize electricity generated by providing a variable mechanical linkage between the RCIC turbine and RCIC pump. The RCIC pump can be decoupled from the turbine when water flow is to be stopped. The RCIC system can be geared down or up to adjust the water flow. Since the turbine is continually running, battery power is only required for the initial starting of the turbine. Additionally, since the turbine is always running freely, maximal electricity is generated, extending the duration of blackout handling or the number of functions that can be continued during a blackout. Alternatively, the gearing to the generator can be varied to adjust the drag on the turbine shaft. The rotation rate, and thus the water flow rate can be adjusted, while retaining a high level of mechanical energy for generating electricity.

While the present invention has been described in the context of a BWR, those skilled in the art can recognize its applicability to other dual-phase reactors. These and other modifications to and variations upon the described embodiments are provided for by the present invention, the scope of which is limited only by the following claims.

What is claimed is:

1. A nuclear reactor complex comprising:
   a dual-phase nuclear reactor, said nuclear reactor including a reactor pressure vessel, a reactor core within said reactor pressure vessel, and recirculation means for circulating fluid within said reactor pressure vessel and through said core to transfer heat generated by said core;
   a main turbine for converting phase-conversion energy stored by vapor into mechanical energy for driving a generator, said turbine being coupled to said reactor via a vapor line during normal operation;
   a main generator for converting said mechanical energy into electricity, said main generator being mechanically coupled to said main turbine via a drive shaft;
   a fluid reservoir external to said reactor;
   a reactor core isolation cooling system with several components at least some of which require electrical power, said components including
      an auxiliary pump for pumping fluid from said reservoir into said reactor pressure vessel,
      an auxiliary turbine for driving said pump, said auxiliary turbine being couplable to said reactor pressure vessel during blackout conditions for receiving vapor therefrom,
      control means for regulating the rotation rate of said auxiliary turbine so as to regulate the rate at which said auxiliary pump pumps fluid into said reactor pressure vessel,
      cooling means for cooling said control means, said cooling means having a input for receiving electrical power, and
      an auxiliary generator coupled to said auxiliary turbine for providing at least a portion of the electrical power required by said components during a blackout condition.

2. A nuclear reactor complex as recited in claim 1 wherein said auxiliary generator provides electrical power for powering said cooling means.

3. A nuclear reactor complex as recited in claim 1 wherein said auxiliary generator provides electrical power for powering said control means.

4. A nuclear reactor complex as recited in claim 1 wherein said cooling means includes a volume of matter maintained in a first phase by electrical power during normal operating conditions, said volume of matter contributing to the cooling of said control means during a blackout condition by transitioning to a second phase.

5. A nuclear reactor complex as recited in claim 1 wherein said reactor system includes a battery which is charged during normal operating conditions so as to provide for starting said auxiliary turbine during said blackout condition.

6. A nuclear reactor complex as recited in claim 1 wherein said reactor core isolation cooling system includes an auxiliary battery, said auxiliary battery providing for restarting said auxiliary turbine after it temporary shuts down during said blackout condition, said auxiliary battery being coupled to said auxiliary generator so as to chargeable thereby.

* * * * *